United States Patent
Kardos et al.

(10) Patent No.: US 7,584,749 B2
(45) Date of Patent: Sep. 8, 2009

(54) ARRANGEMENT FOR RECIRCULATION OF EXHAUST GASES OF A CHARGED INTERNAL COMBUSTION ENGINE IN A VEHICLE

(75) Inventors: Zoltan Kardos, Södertälje (SE); Thomas Alsterdal, Södertälje (SE)

(73) Assignee: Scania CV AB (SE)

( * ) Notice: Subject to any disclaimer, the term of this patent is extended or adjusted under 35 U.S.C. 154(b) by 0 days.

(21) Appl. No.: 11/721,765

(22) PCT Filed: Jan. 25, 2006

(86) PCT No.: PCT/SE2006/000102
§ 371 (c)(1),
(2), (4) Date: Jun. 26, 2007

(87) PCT Pub. No.: WO2006/083210
PCT Pub. Date: Aug. 10, 2006

(65) Prior Publication Data
US 2008/0135028 A1    Jun. 12, 2008

(30) Foreign Application Priority Data
Feb. 2, 2005 (SE) .................................... 0500244

(51) Int. Cl.
*F02M 25/08* (2006.01)
*F02M 25/00* (2006.01)
(52) U.S. Cl. ................. 123/568.12; 123/41.31
(58) Field of Classification Search ............ 123/568.12, 123/568.11, 41.31; 60/278, 280, 298, 605.1, 60/605.2
See application file for complete search history.

(56) References Cited

U.S. PATENT DOCUMENTS

| 4,258,687 | A | * | 3/1981 | Mauch et al. | ........... 123/568.12 |
| 6,138,649 | A | | 10/2000 | Khair et al. | ............. 123/568.12 |
| 6,360,702 | B1 | * | 3/2002 | Osada | ...................... 123/41.31 |
| 6,604,514 | B1 | | 8/2003 | Englund et al. | .......... 123/559.1 |
| 6,681,171 | B2 | * | 1/2004 | Rimnac et al. | .............. 701/108 |
| 7,089,890 | B2 | * | 8/2006 | Obidi | ....................... 123/41.31 |

(Continued)

FOREIGN PATENT DOCUMENTS

DE    198 53 455    6/1999

(Continued)

OTHER PUBLICATIONS

Bilek Andreas, "PTO translation of de-19853455", Cooler Arrangement For SuperCharged Internal Combustion, Jun. 2, 1999.*

(Continued)

*Primary Examiner*—Mahmoud Gimie
(74) *Attorney, Agent, or Firm*—Ostrolenk Faber LLP

(57) ABSTRACT

An arrangement for recirculation of exhaust gases of a supercharged combustion engine in a vehicle. An inlet line for supply of compressed air to the combustion engine. The inlet line includes a charge air cooler for cooling the air. A return line connects the exhaust line to the inlet line and the return line recirculates exhaust gases from the exhaust line to the inlet line. The return line includes an EGR cooler for cooling the recirculating exhaust gases. The EGR cooler and the charge air cooler are arranged close to the combustion engine on the cold side of the combustion engine where a branched inlet pipe is fastened.

15 Claims, 3 Drawing Sheets

U.S. PATENT DOCUMENTS

| | | | |
|---|---|---|---|
| 7,182,074 B1 * | 2/2007 | Redon et al. | 123/568.12 |
| 2006/0005791 A1 * | 1/2006 | Obidi | 123/41.29 |
| 2006/0064968 A1 * | 3/2006 | Sunohara et al. | 60/285 |

FOREIGN PATENT DOCUMENTS

| | | |
|---|---|---|
| FR | 2 840 363 | 12/2003 |
| WO | WO 88/06679 | 9/1988 |

OTHER PUBLICATIONS

International Search Report PCT/SE2006/000102 dated Apr. 12, 2006.

* cited by examiner

US 7,584,749 B2

ARRANGEMENT FOR RECIRCULATION OF EXHAUST GASES OF A CHARGED INTERNAL COMBUSTION ENGINE IN A VEHICLE

CROSS REFERENCE TO RELATED APPLICATION

The present application is a 35 U.S.C. §§ 371 national phase conversion ofPCT/SE2006/000102, filed 25 Jan. 2006, which claims priority of Swedish Application No. 0500244-9, filed 2 Feb. 2005. The PCT International Application was published in the English language.

BACKGROUND TO THE INVENTION, AND STATE OF THE ART

The present invention relates to an arrangement for recirculation of exhaust gases of a supercharged combustion engine in a vehicle.

The technique referred to as EGR (Exhaust Gas Recirculation) is a known means of recirculating part of the exhaust gases from a combustion process in a combustion engine, via a return line, to an inlet line for supply of air to the combustion engine. A mixture of air and exhaust gases is thus supplied via the inlet line to the engine's cylinders in which combustion takes place. Adding exhaust gases to the air causes a lower combustion temperature which results inter alia in reduction of the content of nitrogen oxides ($NO_x$) in the exhaust gases. This technique is used for both Otto engines and diesel engines. The recirculating exhaust gases are usually cooled in a so-called EGR cooler before being led to the combustion engine. An existing circulating coolant of the combustion engine's cooling system is usually used for cooling the exhaust gases in the EGR cooler.

The amount of air which can be supplied to a supercharged combustion engine depends on the pressure of the air but also on the temperature of the air. In order to supply as large an amount of air as possible to the combustion engine, the compressed air is therefore cooled before being led to the combustion engine. The compressed air is usually cooled in a charge air cooler situated at a front portion of the vehicle where it is cooled by ambient air flowing through the charge air cooler. The compressed air may be cooled to a temperature substantially corresponding to the temperature of the surroundings.

Providing such recirculation of exhaust gases involves arranging in the vehicle a return line for exhaust gases with, inter alia, an EGR cooler. Providing a supply of compressed air to the combustion engine entails arranging in the vehicle an inlet line for air with, inter alia, a charge air cooler. In a fitted state, the return line and the inlet line with their constituent components occupy a relatively large amount of space in a vehicle.

SUMMARY OF THE INVENTION

The object of the present invention is to provide an arrangement which comprises a return line for recirculation of exhaust gases of a supercharged combustion engine, and an inlet line for supply of compressed air to the combustion engine, whereby said lines can be short and be of compact configuration.

This object is achieved with the arrangement herein. Fitting the EGR cooler and the charge air cooler close to the combustion engine means that the whole of the inlet line and the return line can be situated in proximity to the combustion engine. Both the inlet line and the return line may thus have a substantially minimum extent between the cold side and the hot side of the combustion engine. The EGR cooler and the charge air cooler may be fitted directly on the combustion engine or indirectly on it via, for example, tubular portions of the return line or the inlet line. The EGR cooler and the charge air cooler have with advantage an elongate shape so that they may form part of the return line and the inlet line respectively. The tubular portions of the return line and the inlet line can therefore be made shorter. Such fitting of the EGR cooler and the charge air cooler makes it possible to provide an arrangement with compact construction which occupies relatively little space in the vehicle. The EGR cooler and the charge air cooler are fitted on the cold side of the diesel engine, so the heat which the combustion engine emits will not appreciably affect the cooling of the exhaust gases in the EGR cooler and the air in the charge air cooler.

According to preferred embodiment of the present invention, the EGR cooler is arranged in the vehicle at a lower level than the branched inlet pipe. The EGR cooler may be arranged at least partly below the branched inlet pipe. There is usually space here for fitting the EGR cooler. The closer the EGR cooler is fitted to the centrally situated vertical plane through the combustion engine, the shorter and more compact the return line can be. The EGR cooler is with advantage adapted to having a liquid cooling medium flowing through it for cooling the recirculating exhaust gases. A liquid-cooled EGR cooler provides substantially more cooling capacity than a gas-cooled EGR cooler of comparable size. An EGR cooler in which a liquid cooling medium is used can therefore be of compact configuration. The EGR cooler takes with advantage the form of a counterflow heat exchanger in which the exhaust gases and the cooling medium flow in opposite directions in separate channels within the EGR cooler. With such an EGR cooler suitably dimensioned the exhaust gases can be cooled to an outlet temperature only slightly exceeding the inlet temperature of the cooling medium.

According to another preferred embodiment of the invention, the charge air cooler is arranged in the vehicle at a lower level than the branched inlet pipe. The charge air cooler may be arranged at least partly below the branched inlet pipe. There is likewise usually space here for fitting the charge air cooler. The closer the charge air cooler is fitted to the centrally situated vertical plane through the combustion engine, the shorter and more compact the inlet line can be. The charge air cooler is with advantage adapted to having a liquid cooling medium flowing through it for cooling the recirculating exhaust gases. A liquid-cooled charge air cooler provides substantially more cooling capacity than a gas-cooled charge air cooler of comparable size. The charge air cooler can therefore be of compact configuration. The charge air cooler may take the form of a counterflow heat exchanger in which the compressed air and the cooling medium flow in opposite directions in separate channels within the charge air cooler. Such a charge air cooler suitably dimensioned makes it possible for the air to be cooled to an outlet temperature only slightly exceeding the inlet temperature of the cooling.

According to another preferred embodiment of the invention, the inlet line comprises a tubular portion which leads the air and the recirculating exhaust gases into the inlet pipe, whereby the EGR cooler and the charge air cooler are arranged on opposite sides of a center line which extends through the tubular portion. The inlet pipe usually has an extent along at least part of the cold long side of the combustion engine. In such cases the tubular portion may extend substantially vertically upwards and end substantially centrally on the inlet pipe. The EGR cooler and the charge air cooler may constitute a composite unit. Such a composite unit makes it easy to fit the EGR cooler and the charge air cooler simultaneously.

According to another preferred embodiment of the invention, the combustion engine is fitted in the vehicle in such a way that the vertical plane extends in the longitudinal direction of the vehicle and that the combustion engine has a substantially transverse forward wall surface and a substantially transverse rear wall surface, whereby the return line extends from the first side to the second side of the combustion engine via a pipeline portion which extends around the transverse rear wall surface and the inlet line extends from the first side to the second side of the combustion engine via a pipeline portion which extends around the transverse forward wall surface. In such cases, the return line and the inlet line thus extend around the combustion engine in different directions. Alternatively, the return line may extend around the forward wall surface of the combustion engine and the inlet line around the rear wall surface.

BRIEF DESCRIPTION OF THE DRAWINGS

Preferred embodiments of the invention are described below by way of examples with reference to the attached drawings, in which.

DETAILED DESCRIPTION OF PREFERRED EMBODIMENTS OF THE INVENTION

Figure 1:
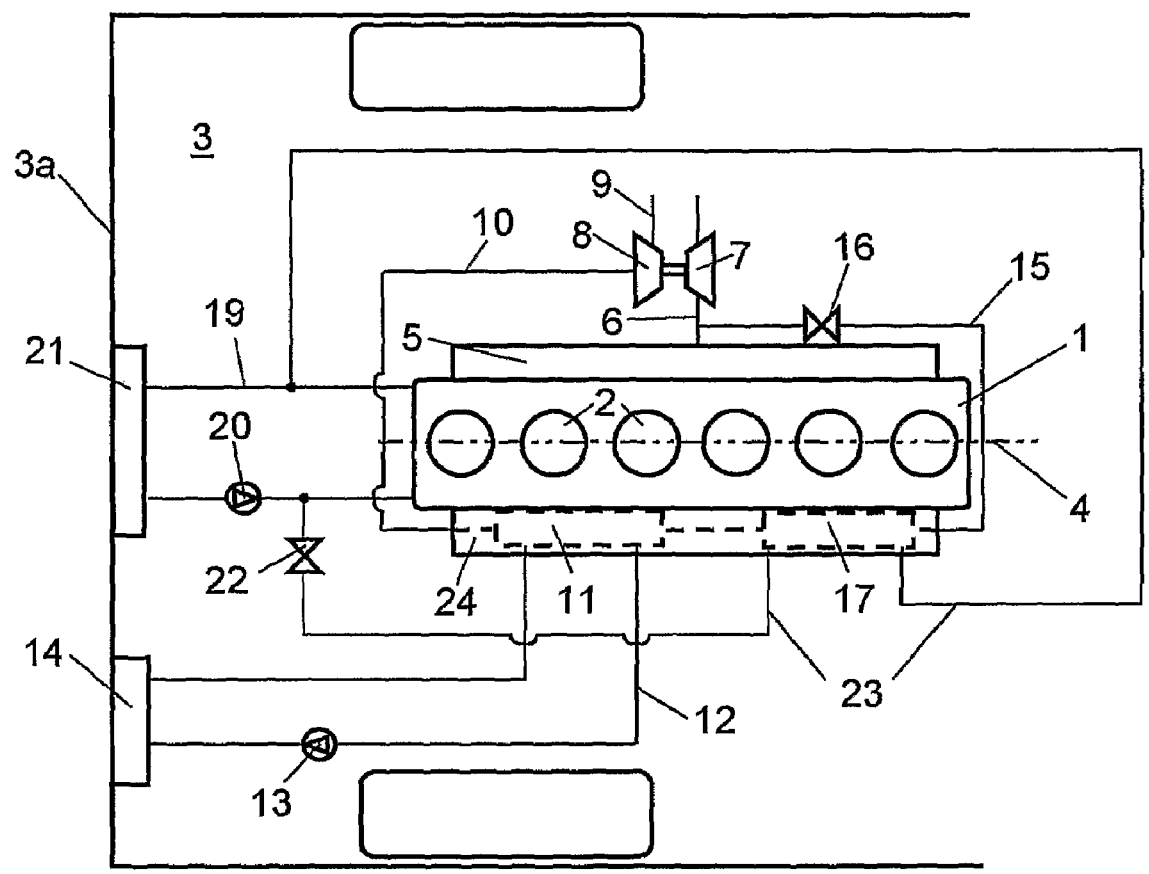
FIG. 1 depicts schematically a combustion engine with an arrangement according to a first embodiment of the invention.

FIG. 1 depicts an arrangement for recirculation of exhaust gases of a supercharged combustion engine. The combustion engine in this case is exemplified as a diesel engine 1 with six cylinders 2. The diesel engine 1 is fitted in a schematically depicted vehicle 3 which may be a heavy vehicle. A front surface 3a is indicated on the vehicle 3. A vertical plane 4 is marked as extending substantially centrally through the diesel engine 1 and its cylinders 2. The diesel engine 1 is fitted in the vehicle 3 in such a way that said vertical plane 4 extends in the longitudinal direction of the vehicle. A branched exhaust pipe 5 extends substantially along the hot long side of the whole combustion engine. The purpose of the branched exhaust pipe 5 is to lead the exhaust gases from the combustion processes in the cylinders 2 of the diesel engine 1 to an exhaust line 6. The exhaust gases in the exhaust line 6, which are at a positive pressure, drive a turbine 7. The turbine 7 is thus provided with driving power which is transmitted, via a connection, to a compressor 8. The compressor 8 compresses air drawn in via an inlet 9. An inlet line 10 leads the compressed air to a charge air cooler 11 situated close to the diesel engine 1 on the latter's cold side. The compressed air in the charge air cooler 11 is cooled by a coolant which is circulated in a separate cooling system 12 by a coolant pump 13. The coolant is cooled in a radiator element 14 fitted at the vehicle's front portion 3a.

Recirculation of exhaust gases is usually called EGR (Exhaust Gas Recirculation). Adding exhaust gases to the compressed air which is led to the engine's cylinders lowers the combustion temperature and hence also the content of nitrogen oxides ($NO_x$) formed during combustion processes in the cylinders 2. A return line 15 provides recirculation of part of the exhaust gases in the exhaust line 6. The return line 15 extends from the exhaust line 6 to the inlet line 10. The return line 15 comprises an EGR valve 16 by which the exhaust flow in the return line 15 can be shut off as necessary. The EGR valve 16 may also be used for controlling the amount of exhaust gases led from the exhaust line 6 to the inlet line 10 via the return line 15. The return line 15 also comprises an EGR cooler 17 intended to cool the exhaust gases before they mix with compressed air in the inlet line 10. The exhaust gases are cooled in the EGR cooler 17 by a liquid which circulates in a schematically depicted ordinary cooling system 19 of the vehicle in order to cool the diesel engine 1. The coolant is circulated in the ordinary cooling system 19 by a coolant pump 20 and is cooled by ambient air when it is led through a radiator element 21 fitted at the front portion 3a of the vehicle. Coolant from the ordinary cooling system 19 can be led via a valve 22 into a parallel cooling circuit 23 which leads the coolant through the EGR cooler 17. After the coolant has cooled the recirculating exhaust gases in the EGR cooler 17, the coolant is led back to the ordinary cooling system 19.

Figure 2:
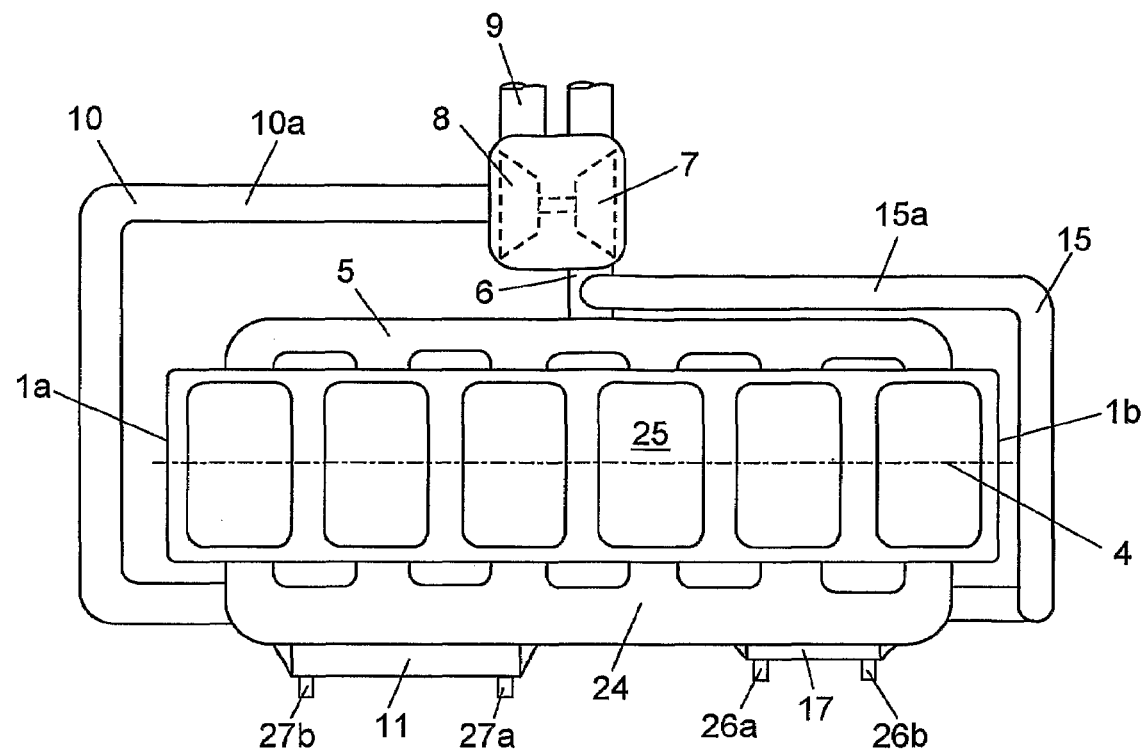
FIG. 2 depicts the arrangement in FIG. 1 in more detail.
Figure 3:
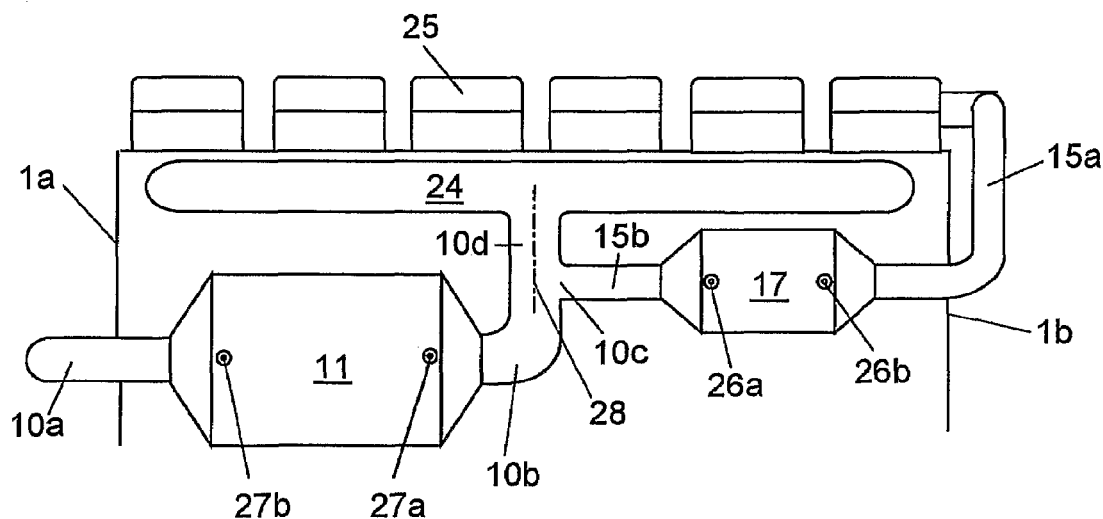
FIG. 3 depicts the arrangement in FIG. 2 as viewed from the cold side of the combustion engine and FIG. 4 depicts an arrangement according to a second embodiment of the invention.

FIGS. 2 and 3 depict the arrangement in more detail. The diesel engine 1 is an in-line engine with six cylinder heads 25 which each contain a cylinder 2. The diesel engine 1 is fitted in the vehicle 3 in such a way that it has a substantially transverse forward wall surface 1a and a substantially transverse rear wall surface 1b in relation to the vertical plane 4. The return line 15 for exhaust gases comprises a first tubular portion 15a extending between the exhaust line 6 and the EGR cooler 17. The first tubular portion 15a comprises at a suitable point the EGR valve 16. The first tubular portion 15a initially extends substantially vertically upwards from the exhaust pipe 6 to a level above the branched inlet pipe 5. The first tubular portion 15a extends thereafter along part of the hot side of the diesel engine 1 before extending round the transverse rear wall surface 1b of the diesel engine 1. This extent of the first tubular portion 15a is at a substantially constant level in height with the cylinder heads 25 of the combustion engine 1. Thereafter the first tubular portion 15a extends downwards and in under a branched inlet pipe 24 where it is connected to the EGR cooler 17. The branched inlet pipe 24 is fastened to the cold side of the combustion engine, where it extends along substantially the whole cold side so that it can lead air and exhaust gases into the in-line cylinders 2 of the combustion engine. The EGR cooler 17 is thus fitted on the cold side of the diesel engine 1 at a position partly below the branched inlet pipe 24. The EGR cooler 17 has an inlet 26a and an outlet 26b for the coolant carried in the parallel cooling circuit 23.

The inlet line 10 for the compressed air comprises a first tubular portion 10a extending between the compressor 8 on the hot side of the combustion engine 1 and the charge air cooler 11 on the cold side of the combustion engine 1. The first tubular portion 10a has an extent around the transverse forward wall surface 1a in proximity to the combustion engine 1 at a substantially constant height level. The charge air cooler 11 is fitted on the cold side of the diesel engine 1 at a position partly below the branched inlet pipe 24. The charge air cooler 11 has an inlet 27a and an outlet 27b for the coolant of the separate cooling system 12. A second tubular portion 10b of the inlet line 10 leads air from the charge air cooler 11 to a connection point 10c where the air is mixed with recirculating exhaust gases. The recirculating exhaust gases are led to the inlet line via a second tubular portion 15b extending between the EGR cooler 17 and the connection point 10c. The inlet line 10 comprises thereafter a third tubular portion 10d which leads the mixture of air and exhaust gases into the branched inlet pipe 24. The third tubular portion 10*d* of the inlet line extends substantially vertically upwards to a central portion of the branched inlet pipe 24. The EGR cooler 17 and the charge air cooler 11 are arranged on opposite sides of a center line 28 which extends through the third tubular portion 10*d* of the inlet line.

The EGR cooler 17 is a counterflow heat exchanger in which the exhaust gases flow within the EGR cooler 17 in one direction and the coolant in an opposite direction in separate channels separated by heat-transferring surfaces. With a suitably dimensioned EGR cooler 17, the exhaust gases can be cooled to a temperature substantially corresponding to the temperature of the circulating coolant. The charge air cooler 11 is also of counterflow heat exchanger construction whereby the compressed air flows inside the charge air cooler 11 in one direction and the coolant in an opposite direction in separate channels separated by heat-transferring surfaces. With a suitably dimensioned charge air cooler 11 the exhaust gases can be cooled to a temperature substantially corresponding to the temperature of the circulating coolant. The charge air cooler 11 and the EGR cooler 17 have extents such that they constitute portions of the inlet line 10 and the return line 15. The tubular portions 10*a, b, d* of the inlet line and the tubular portions 15*a,* b of the return line can therefore be of reduced length. With such an arrangement of the charge air cooler 11 and the EGR cooler 17 it is possible to provide an inlet line 10 and a return line 15 which extend around the combustion engine 1 from the hot side to the cold side at a relatively small distance from the combustion engine 1. The inlet line 10 and the return line 15 may thus be of substantially minimum length. Placing the charge air cooler 11 and the EGR cooler 17 on the cold side of the combustion engine also facilitates a compact configuration of the arrangement so that it occupies a relatively small space in the vehicle.

During operation of the diesel engine 1, the exhaust gases in the exhaust line 6 drive a turbine 7 before they are led out to the surroundings. The turbine 7 is thus provided with driving power which drives the compressor 8. The compressor 8 compresses the air led in via the inlet 9. The compressed air is led via the first portion of the inlet line 10*a* to the charge air cooler 11, in which it is cooled by the circulating coolant of the separate cooling system 12. With suitable dimensioning of the separate cooling system, the compressed air in the charge air cooler 11 can be cooled to a temperature which exceeds the temperature of the surroundings by only a few degrees. In most operating states of the diesel engine 1, the EGR valve 16 is open, with the result that part of the exhaust gases in the exhaust line 6 is led into the return line 15. The exhaust gases in the exhaust line 6 are usually at a temperature of about 600-700° C. When the recirculating exhaust gases in the return line 15 reach the EGR cooler 17, they are cooled by the coolant of the cooling circuit 23. The exhaust gases can be cooled in the EGR cooler 17 to a temperature corresponding to the temperature of the coolant of the ordinary cooling system 19. The temperature of the coolant during normal operation is within the range 80-100° C. The cooled exhaust gases are thereafter mixed with the cooled compressed air, followed by the mixture being led to the respective cylinders 2 of the diesel engine 1 via the third tubular portion 10*d* and the branched inlet pipe 24.

Figure 4:
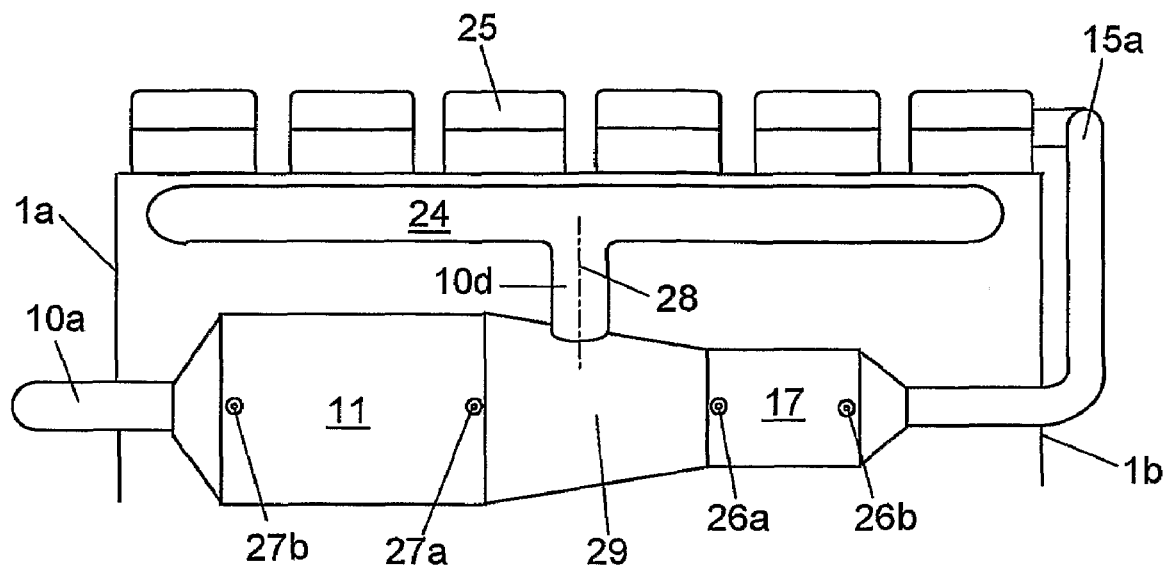

FIG. 4 depicts an alternative arrangement whereby the charge air cooler 11 and the EGR cooler 17 are comprised in a composite unit fittable as a single item. The charge air cooler 11 and the EGR cooler 17 are thus easier to fit at the same time. The composite unit comprises not only the coolers 11, 17 but also a pooling space 29 in which the cooled compressed air is mixed with the cooled exhaust gases before the mixture is led to the branched inlet pipe 24 via the third tubular portion 10*d* of the return line. In certain operating states of supercharged combustion engines 1, the pressure of the exhaust gases in the return line 15 is lower than the pressure of the compressed air in the inlet line 10. Auxiliary means, e.g. a venturi which may be situated in the pooling space 29, can be used for local lowering of the static pressure of the air in the inlet line 10, so that the exhaust gases can be led in and mixed with the compressed air.

The invention is in no way limited to the embodiments described in relation to the drawings but may be varied freely within the scopes of the claims. The combustion engine may be of substantially any desired kind with any desired number of cylinders. The return line may comprise more than one EGR cooler and the inlet line may comprise more than one charge air cooler.

The invention claimed is:

1. An arrangement for recirculation of exhaust gases of a supercharged combustion engine, wherein the combustion engine comprises:
   an in-line cylinder configuration along a vertical plane extending substantially centrally through said combustion engine;
   a branched inlet pipe fastened to the combustion engine on a first side of the vertical plane which extends centrally through the combustion engine, the inlet pipe being operable for supplying air and recirculating exhaust gases to at least two cylinders of the combustion engine,
   an exhaust line for exhaust gases, a branched exhaust pipe, fastened to the engine at a second side of the centrally situated vertical plane, the exhaust pipe being operable for leading the exhaust gases from at least two cylinders of the combustion engine to the exhaust line
   an inlet line for supply of compressed air to the combustion engine, the inlet line comprises a charge air cooler for cooling the air
   a return line which connects the exhaust line to the inlet line, the return line being operable to recirculate exhaust gases from the exhaust line to the inlet line, the return line includes an EGR cooler for cooling the recirculating exhaust gases,
   the EGR cooler and the charge air cooler are arranged adjacent to the combustion engine on the first side of the vertically situated plane where the branched inlet pipe is fastened.

2. An arrangement according to claim 1, wherein the EGR cooler is arranged in use at a lower level than the branched inlet pipe.

3. An arrangement according to claim 2, wherein the EGR cooler is arranged in use at least partly below the branched inlet pipe.

4. An arrangement according to claim 1, wherein the EGR cooler is operable for having a liquid cooling medium flowing through it in order to cool the recirculating exhaust gases.

5. An arrangement according to claim 3, wherein the charge air cooler is arranged in use at a lower level than the branched inlet pipe.

6. An arrangement according to claim 5, wherein the charge air cooler is arranged in use at least partly below the branched inlet pipe.

7. An arrangement according to claim 1, wherein the charge air cooler is operable for having a liquid cooling medium flowing through it in order to cool the compressed air.

8. An arrangement according to claim 1, wherein the inlet line comprises a tubular portion which leads the air and the recirculating exhaust gases into the inlet pipe, and the EGR cooler and the charge air cooler are arranged on opposite sides of a center line which extends in the longitudinal direction of the tubular portion.

9. An arrangement according to claim 1, wherein the EGR cooler and the charge air cooler constitute a composite unit.

10. An arrangement according to claim 1, further comprising the combustion engine being fitted in the vehicle in such a way that the vertical plane extends in a longitudinal direction of the vehicle, the combustion engine has a substantially transverse forward wall surface transverse to the longitudinal direction and a substantially transverse rear wall surface transverse to the longitudinal direction, the return line extends from the first side to the second side around the transverse rear wall surface and the inlet line extends from the first side to the second side round the transverse forward wall surface.

11. An arrangement according to claim 1, wherein the charge air cooler is arranged in use at a lower level than the branched inlet pipe.

12. An arrangement according to claim 1, wherein the charge air cooler is operable for having a liquid cooling medium flowing through it in order to cool the compressed air.

13. A vehicle operated by a combustion engine comprising at least two cylinders wherein the vehicle comprises:
- a combustion engine having an in-line cylinder configuration along a vertical plane extending substantially centrally through said supercharged combustion engine;
- a branched inlet pipe fastened to the combustion engine on a first side of the vertical plane which extends centrally through the combustion engine, the inlet pipe being operable for supplying air and recirculating exhaust gases to at least two cylinders of the combustion engine,
- an exhaust line for exhaust gases, a branched exhaust pipe, fastened to the engine at a second side of the centrally situated vertical plane, the exhaust pipe being operable for leading the exhaust gases from at least two cylinders of the combustion engine to the exhaust line
- an inlet line for supply of compressed air to the combustion engine, the inlet line comprises a charge air cooler for cooling the air
- a return line which connects the exhaust line to the inlet line, the return line being operable to recirculate exhaust gases from the exhaust line to the inlet line, the return line includes an EGR cooler for cooling the recirculating exhaust gases,
- the EGR cooler and the charge air cooler are arranged adjacent to the combustion engine on the first side of the vertically situated plane where the branched inlet pipe is fastened.

14. An arrangement according to claim 1, wherein the inlet line comprises a tubular portion which leads the air and the recirculating exhaust gases into the inlet pipe, and the EGR cooler and the charge air cooler are arranged along one side of the engine.

15. An arrangement according to claim 14, wherein the engine has an air inlet and an exhaust outlet side and the coolers are on the first side of the engine.

* * * * *